United States Patent [19]

Sullivan et al.

[11] Patent Number: 5,956,711

[45] Date of Patent: Sep. 21, 1999

[54] DATABASE SYSTEM WITH RESTRICTED KEYWORD LIST AND BI-DIRECTIONAL KEYWORD TRANSLATION

[75] Inventors: Walter J. Sullivan, Ft. Lauderdale; Carlos D. Aponte, Coconut Creek; Ivan K. Saltz, Plantation, all of Fla.

[73] Assignee: Walter J. Sullivan, III, Ft. Lauderdale, Fla.

[21] Appl. No.: 08/784,940

[22] Filed: Jan. 16, 1997

[51] Int. Cl.$^6$ .................................................. G06F 17/00
[52] U.S. Cl. ......................... 707/6; 707/3; 707/5; 707/7; 395/708
[58] Field of Search ................ 707/1–206; 395/701–712

[56] References Cited

U.S. PATENT DOCUMENTS

| | | | |
|---|---|---|---|
| 4,783,758 | 11/1988 | Kucera | 364/900 |
| 4,823,306 | 4/1989 | Barbic et al. | 364/900 |
| 4,829,423 | 5/1989 | Tennant et al. | 364/300 |
| 4,843,538 | 6/1989 | Lane et al. | 364/188 |
| 5,041,967 | 8/1991 | Ephrath et al. | 364/200 |
| 5,367,453 | 11/1994 | Capps et al. | 364/419.13 |
| 5,369,577 | 11/1994 | Kadashevich et al. | 364/419.13 |
| 5,392,390 | 2/1995 | Crozier | 395/161 |
| 5,420,975 | 5/1995 | Blades et al. | 395/156 |
| 5,454,106 | 9/1995 | Burns et al. | 395/600 |
| 5,481,647 | 1/1996 | Brody et al. | 395/51 |
| 5,555,169 | 9/1996 | Namba et al. | 364/419.08 |
| 5,787,423 | 7/1998 | Hirakawa | 707/5 |
| 5,787,426 | 7/1998 | Koshiba et al. | 707/7 |
| 5,794,050 | 8/1998 | Dahlgren et al. | 395/708 |

*Primary Examiner*—Wayne Amsbury
*Assistant Examiner*—David Yiuk Jung
*Attorney, Agent, or Firm*—John C. Smith

[57] ABSTRACT

A system for use with a database selects keywords from a restricted keyword list for both updating and searching (i.e. bi-directional keyword translation). A keyword translator accepts a user entered keyword and selects a restricted keyword for use (e.g., entry or search) with a database. The keyword entered may be chosen by the user based on the user's preference. The system compares the user-entered keyword with a list of restricted keywords to determine whether there exists in the list of restricted keywords a matching restricted keyword corresponding to the user-entered keyword. If there is a restricted keyword in the list of restricted keywords that corresponds to the user-entered keyword, the system selects the matching restricted keyword for use with the database. If there is not a matching restricted keyword in the list of restricted keywords corresponding to the user-entered keyword, the system compares the user-entered keyword with a list of synonyms to find in the list of synonyms a synonym that corresponds to the user-entered keyword. Each synonym in the list is associated with a restricted keyword. If a synonym corresponding to the user-entered keyword is found, the system selects, for use with the database, the restricted keyword associated with (or corresponding to) the synonym found.

94 Claims, 7 Drawing Sheets

DATABASE SYSTEM WITH RESTRICTED KEYWORD LIST AND BI-DIRECTIONAL KEYWORD TRANSLATION

BACKGROUND OF THE INVENTION

1. Technical Field

The present invention relates to database query systems. In particular, it relates to database query systems which reduce sensitivity to keyword selection by automatically translating keywords when data is inserted into the database and automatically translating keywords when a query is made to the database.

2. Background Art

For many industries, there are a variety of uses to which a database query system can be put to use, including billing, sales, personnel records, medical and legal data, parts, inventory, etc. Early database systems typically required highly skilled personnel both to create original data entries and to construct queries to search the database. As the cost of computing decreased and database applications were extended to more industries and distributed to larger and more diverse groups of users, the training level and language background of the personnel using database systems became increasingly unpredictable. With the advent of the Internet and wide area networks, users in different parts of the country, or even the world, who are collaborating, use different terminology or language. All these factors present challenges to designing database systems that can be built and queried from all over the world.

While personnel who enter data would typically have some minimal knowledge of the database system, the end users who query the database systems may have very low levels of training or none at all. As a result, end users may have difficulty locating an item of data even if it is available. In addition, some systems now allow users from different regions and of different training levels, to update existing entries in a database or to add new entries. The use of database systems by untrained users can degrade the effectiveness of the system because entries and/or queries may be made using unusual, obscure or mis-descriptive keywords which result in missed matches during a query.

The problems caused by poor keyword selection are magnified by database systems which service users in widely spread locations and/or locations that use different languages or dialects. For example, a user who is accessing data in a database that was created in another language, or even the same language with regional differences, is far more likely to use a keyword that is familiar to his/her culture, but is not the keyword used by the originator of the information. While that user may merely get unsatisfactory results during a query, if that user is formulating an entry for the database, then his use of an inappropriate keyword creates a problem when other users are searching for it.

Even if a user is very skilled and highly trained, language varies from one part of the country to another, and from one country to another. For example, an American seeking to buy a home with two bathrooms in England would have to know that they were called water closets to be successful in a search. Otherwise, the query would result in no matches due to the language difference, even though the house had the desired feature.

As database applications are made available to wider and more diverse groups of users, the ability to enter and query the data will become increasingly more dependent on the system's ability to find data regardless of the keywords selected. Commercial databases now serve international and global markets. With the emergence of the Internet as an important commercial communications resource, it has become even more desirable to have a system that could translate keywords such that a search would successfully locate a data item even when colloquial keywords were used during the original data entry or during subsequent database queries. Further, it would be even more desirable to have a system which would generate an effective search argument even when both the original data entry and the subsequent database query use regional, ineffective or obscure keywords.

Prior art search systems have tried to increase the number of matches by allowing a user to enter a partial keyword. This type of search is called stem searching. For example, the stem "bath" would return all records with bath, baths, bathroom, etc. Unfortunately, the language difference which results in the selection of "bath" versus "water closet" would not result in a successful search using prior art stem based systems.

Another common prior art technique is to use a thesaurus to generate multiple queries for each keyword that the user enters. So a user desiring to locate an apartment in a real estate system may enter the keyword "apartment", but the system will search for apartment, apartments, condominium, condominiums, condo, flat, flats, quarters, duplex, studio etc. The result is multiple searches resulting in an inefficient database.

While earlier database applications may have had untrained users on the query side, they would usually have users with some training, even if minimal, on the data input side. Now however, systems are available in which data is subject to poor keyword selection from both directions: data input and data query. For example, a number of database systems have been developed to provide information related to the buying, selling or renting of particular types of property. For example, real estate listing services have cropped up on the Internet which allow anyone to write their own "ad".

This type of database query system (i.e., systems which are used to sell or trade property) are particularly susceptible to keyword related problems. The reason for this is that users of these systems who may be experts on the particular types of property they trade in, may be inexperienced with computers or even computer illiterate. Their lack of computer skill results in a poor choice of keywords because they do not understand the implications of a particular keyword selection. The problems related to keyword selection are magnified by this type of system, because the same users who enter poorly formed keywords are often permitted to enter data into the database for use by other users. The problem is compounded by users, who may or may not be experienced with computers, but who have no knowledge of the jargon used in the subject of the database. Of course, this problem is even further complicated when users that speak or use different dialects or languages attempt to enter or query the database.

A real estate listing system is most often used by individuals in a relatively confined geographic area. Using colloquial expression, they may be unconcerned with other users who may have different jargon or language. Therefore, the problems caused by the use of dialectical keywords in a system with a geographically confined audience are minimal. However, systems similar to a real estate listing system, such as those used on an international or global basis to trade property or commodities, are more prone to errors due to keyword selection. For example, the market for high quality or luxury items such as yachts, aircraft, exotic cars, businesses or luxury estate properties are marketed over wide, even global, markets. Wide geographic markets not only create problems due to multi-lingualism in the user population, but also create problems due to regional dialect or slang variations in a single language. It would be desirable to have a database system capable of use over wide areas or multilingual areas which could insulate users from keyword selection problems caused by language differences.

By way of example, airplanes have substantial values which tend to limit their sale in a local market. The most effective way to market commodities such as airplanes is by reaching an international market through a globally accessible database system in which information can be exchanged between buyers and sellers, and their agents. Those skilled in the art will recognize that while any size and price of airplane could be listed in a global database, the desirability of a larger audience or international database increases as the price of the item increases.

The following is an example of the problems language and keyword selection may cause. A listing database for yachts may result in a yacht owner in Hawaii listing a boat located in Baja, Mexico with a yacht broker in San Diego, Calif. A buyer in Switzerland may use a broker in Turkey to search for a desired yacht type. As can be seen, the opportunity for selecting dialectal, slang, local jargon, obscure or ineffective keywords in such a situation greatly increases the chances that the yacht will not be found when the buyer's broker searches the database. Therefore, it would be desirable to have a system which could insulate all of the parties from missed matches due to data entry and query keyword differences, as well as insulating the system from performance problems which result from inefficiently searching the database with an excessive number of keywords.

Prior computer systems directed to these markets have primarily used textual descriptions which are exposed to all of the keyword problems discussed above. In addition, prior systems have not provided a structured database which would more easily define data entries in terms of the unique and myriad structural and equipment combinations available to complex properties such as yachts or airplanes. It would be desirable to have a structured database in which the data entry and query processes could be dynamically altered to accommodate variances in equipment descriptions.

While addressing the basic desirability of using computerized database systems to manage information, the prior art has failed to provide a system which reduces keyword related errors by making both the data entry and the data query applications independent of the keywords used to search the database. In particular, the prior art has not provided a system which accepts any keyword entered and dynamically selects and substitutes keywords from a restricted list of keywords for data entry in the database such that a uniform searchable field is provided for query and then substitutes keywords from the restricted list of keywords for the data query such that the search locates the desired keyword even though the data entry and the data query portions of database access use different keywords. Furthermore, the prior art has not provided a dialect independent query system that allows complete sentences to be created and retrieved, in a grammatically correct form, utilizing a dynamic and configurable list of keywords.

SUMMARY OF THE INVENTION

The present invention solves the foregoing problems by providing a restricted keyword list and bi-directional keyword translation (e.g., data entry or search) for use with a database (a database can be any information storage system). New entries received from a user of the system are input to a keyword translator. A restricted keyword list is accessed by the keyword translator which compares the user-entered input with a restricted list of acceptable keywords and acceptable synonyms. If the input is on the list, it is used. If the input is not on the list, but it is a synonym for a keyword on the list, then the keyword is substituted before storing the information.

During a database query, a query keyword is input to the keyword translator. The restricted keyword list is accessed by the keyword translator which compares the query keyword with a list of acceptable keywords and their synonyms. If the query keyword is on the list, it is used. If the query keyword is not on the list, but it is a synonym for a keyword on the list, then the keyword is substituted. The keyword translator is used when the database is being added or updated and also when the database is being queried by a user, but these activities do not have to occur at the same time or in the same device or system.

The bidirectional keyword substitution (i.e., using keyword substitution when necessary in the data input and data query phases of database use) makes the database independent of the keywords on both the input and query sides of the system. The invention uses selected keywords from the keyword list to ensure that in the process of accessing the database, database entries are not missed due to the use of dialectal or obscure keywords on either the data entry or the data query phases of database use.

DESCRIPTION OF THE PREFERRED EMBODIMENT

For ease of illustration, the following definitions are used throughout this disclosure. The term database, as used herein, can include any form of data storage, including relational databases, flat files, file management systems, object oriented databases, or any data storage which contains discrete fields of information which a user would search for. The terms "dialect" or "dialectal" shall mean any formally recognized foreign language, dialect, colloquialism, local expression, slang or jargon (i.e. technical terms which are normally used in a particular profession or discipline). The term "hit" indicates that a match has been made between the search keyword and a word in the database. The term "listing" means any organized collection of specifications, facts, and opinions used to describe a commodity or property for the purpose of sales or rent. In addition, the use of a specific property type, such as homes, aircraft, etc. is for illustrative purposes only. The features and advantages of the invention can be applied to any subject matter which is suitable for a database.

Figure 1:
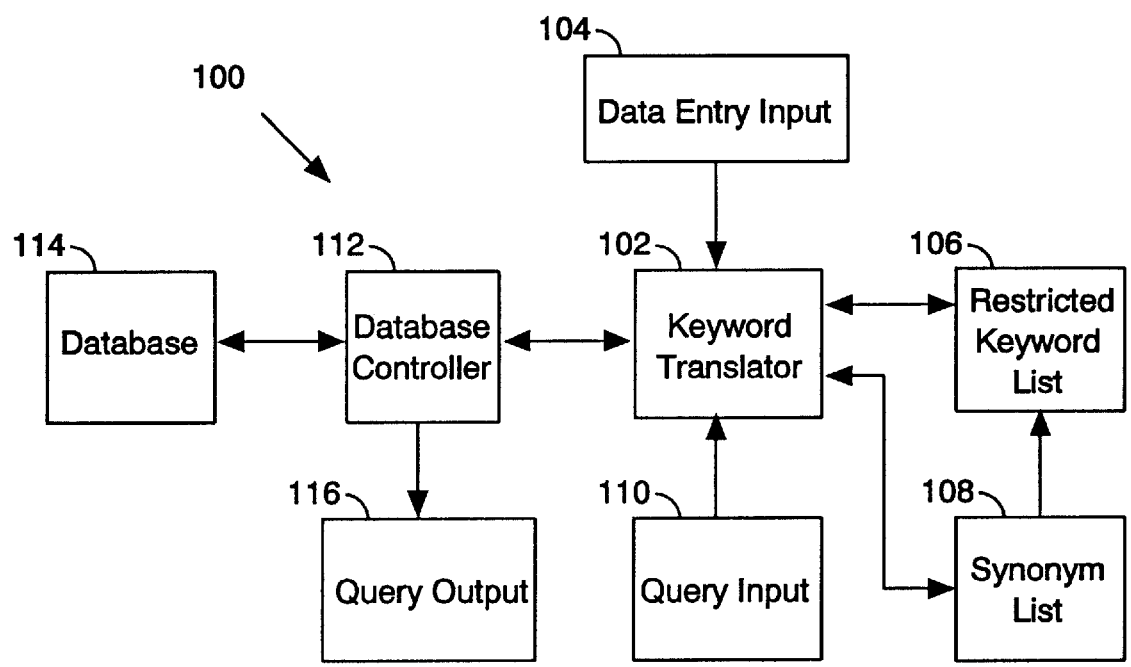
FIG. 1 is a block diagram illustrating the bi-directional keyword substitution system used by the invention.

Referring to FIG. 1, this figure shows a bi-directional keyword substitution system 100 used by the invention. This embodiment is intended for use as an illustrative example to show the benefits of a bidirectional keyword translator. For the purposes of this disclosure, "bidirectional" is defined as the translation of a keyword received from a user, when necessary, to a keyword on a restricted list of keywords both when inputting data records into the database, and when selecting keywords for searching the database. More detailed descriptions of the features and advantages of the system will be discussed in regard to the figures, below.

Database 114 is used for storage of relational database information. The database 114 can be stored in a user's station (e.g., a personal computer) or in a central location (e.g., a server) that can be remotely accessed by a user. The data stored in database 114 can be any useful information which would lend itself to searching for particular data items. For illustrative purposes, a property listing system for boats will be used to show the features and advantages of the system 100. However, those skilled in the art will recognize that information related to any type of property or inventory can be used. Likewise, the particular arrangement of data in the database 114 will vary to suit the nature of the property information stored in the database 114.

A database controller 112 (hereinafter controller 112), is used to add, delete, or update data items in database 114 when listings are added or deleted, or when information related to the property changes. The database controller can be implemented as a data processing apparatus (e.g., a microcomputer) programmed to perform as required for this invention; or, it can be implemented as a system of apparatuses such as two or more computers in a client/server configuration. When the information in database 114 is to be changed in some manner, the user would enter data via data entry input 104 (hereinafter data input 104). Data input 104 can be any suitable device or method used by computers to enter data or commands, such as a keyboard, a mouse, a voice recognition equipment, etc., all of which are well known in the art. In prior art systems, data entries were directly made into the database 114, via a data input device 104 and controller 112. The database controller 112 can be implemented with, for example, any commercially available computer, micro controller or microprocessor.

A disadvantage of directly storing searchable keyword data into database 114 is that a poor choice of keywords by a particular user will make the data records input by that user difficult to locate by subsequent users making database searches. In the area of property listing systems, this problem is exacerbated in several ways. First, database systems are widely available for access by individuals having little or no skill with computers. An unskilled user will typically have no appreciation for the effect of inputting a particular keyword on a subsequent search. Likewise, an unskilled user may not find the data being sought because of an equally poor choice of keywords when performing a search of a database. Due to the increasing number of non-computer professionals who enter and/or search data in relational databases, the ability to successfully locate all of the pertinent records has steadily decreased.

Second, even though a user may be reasonably well versed in computers, the language or dialect of the user will make the user prone to select one type of word, or even one spelling of the same word (e.g., "color" in the United States, v. "colour" in the United Kingdom). Since a property listing system for certain items, such as yachts, lends itself to effective use of a computer network in a global market, language and colloquial variations have become a significant problem.

An alternative embodiment provides language translators which allow data to be entered in one language, stored in the database in a second language, and queried in a third language. The language translator may be an independent function or may be an integral part of the keyword translator. In addition, multiple languages can be incorporated into the same database and selected by user preference or automatically selected when a keyword unique to a given language is entered.

A principal advantage of data base system 100 is the avoidance of errors due to poor keyword selection by a user (e.g., a person buying or selling an object property such as a yacht, or a dealer working with a buyer or seller) in both the data input and data searching operations. Errors are avoided by converting, when appropriate, a keyword received from a user into a keyword which is a member of a limited set of keywords (i.e., a restricted keyword). During a database entry or update operation, a keyword entered by a user into the data input 104 is routed to a translator 102. Prior to entry of data into the database, the translator 102 compares the received user-entered keyword with restricted keywords in a restricted keyword list 106 (hereinafter keyword list 106). If the entered keyword is in the keyword list 106, then it is entered into the database 114 via controller 112.

In the event the entered keyword is not on the keyword list 106, the translator 102 then checks the synonym list 108. Synonym list 108 contains a list of keywords which have the same meaning as related words on the keyword list. For example, one may use the keyword "head" in regard to a bathroom on a boat. However, several other words may be used to describe a head, such as bathroom, lavatory, convenience, john, toilet, commode, etc. In prior art systems, entry of obscure keywords could hinder any subsequent search of the data record.

The benefit of the synonym list 108 is that it has a list of words, such as those discussed above in regard to the keyword "head", which would be equivalents. The benefit of the synonym list 108 is that it has a list of words, such as those discussed above in regard to the keyword "head", which would be equivalents. The equivalent words in the synonym list 108 are related to a single related keyword in the keyword list 106. If the entered keyword is not on the keyword list 106, but it is on the synonym list 108, then the related keyword on the keyword list 106 is selected by the translator 102 and input to the controller 112 which in turn inputs the related keyword to the database 114 instead of the entered keyword. A benefit of restricting the keywords entered into the database during the data entry operation is that such restriction provides a uniform database 114 resulting in improved and more consistent search results.

The keyword list 106 and synonym list 108 can also contain plural forms of each word. Plural forms may be stored as rules or spelled out with each itemcode 206 (shown in FIG. 2A) and synonym 208 (shown in FIG. 2A). The plural form will be found by the keyword translator 102 if the user enters the plural form of the word when describing the object 202 to be entered into the database 114. The keyword translator 102 will substitute the singular form of the itemcode 206 before submitting the records to the database controller 112 for insertion into the database 114. For example, in a luxury real estate listing service, a user may describe a property as having 2 aviaries. The item will be stored in the database as quantity 2, itemcode aviary. Then a user building a query may request a property that has a birdhouse. The keyword translator 102, using the synonym list 108 will substitute the word aviary before submitting the query to the database controller 112 and the appropriate properties will be found.

In the event the entered keyword is not on the keyword list 106 or the synonym list 108, the user can be queried for more information via conventional means (such as a pop-up dialog box in a graphical system asking for another possibility) such that an acceptable keyword can be determined. In the preferred embodiment, the keywords are presented to the user in a list from which he can select them by mouse click. In the event the user cannot find the desired keyword, though, there is a Find button 312 which can help the user find an acceptable keyword. The operation of button 312 is more fully described in Table 4. The invention may be implemented in other ways, though. For example, the user may input the desired keyword into a data entry field and the keyword and synonym lists are subsequently searched via well-known conventional means. If an acceptable match is not then found, the user can be prompted with a request to try a different word.

Once data is stored in the database 114, it is available for searching by other users. However, the same problems exist on the query side of the system that existed on the data entry side. In particular, the language and dialect based errors are present, as well as the problems associated with unskilled users who do not understand the effect of their keyword choices on the resulting search output.

During a search operation, a user makes database queries via the query input 110. The query input 110 can be any suitable device or method used by computers or other data processing apparatus to enter data or commands, such as a keyboard, a mouse, a touch screen or voice recognition equipment, etc., all of which are well known in the art. Query keywords are routed to the translator 102 which searches the keyword list 106 and synonym list 108 in the same manner as the input keyword was searched above with respect to the data entry operation.

A principal advantage of the instant invention is that it ensures that the controller 112 uses the same keywords for both the data entry and the data search operations. As a result, the errors and omissions which are caused by the use of obscure or mismatched keywords are substantially or completely eliminated.

Another advantage of the invention is that it allows the use of local expressions and colloquialisms in listings. For example, an agent in France may insist on using the word "settee" in his listings because he feels it sounds better than "couch," or some other term. The use of the restricted keyword searching, as discussed above, will allow the listing agent to use keywords which are appropriate for the agent's location, while allowing an agent in a distant location such as California to search the database 114 using a synonym such as "couch" and still find the French agent's listing.

Those skilled in the art will recognize that a variety of changes can be made to the preferred embodiment of FIG. 1, while still using the invention. For example, the data entry input 104 and the query input 110 are shown as separate devices. When data is input by a user in one location and accessed by users in remote locations, then the devices will typically be separate. However, they can be a single device. For example, a single keyboard in one computer could be made to accomplish both functions. Likewise, either device can be any apparatus capable of receiving data, such as a touch panel screen, a light pen and screen, voice recognition equipment or a mouse and screen combination.

The keyword translator 102 can be a single unit or there can be a keyword translator 102 dedicated to the data entry input 104 and a second keyword translator 102 dedicated to the query input 110. The query output 116 can be a conventional display, a voice synthesizer system, or other suitable device. The data entry input 104, the query input 110, and the query output 116 can also all be implemented by a single touch panel display. Of course, in a large system, multiple data entry inputs 104 and query inputs 110 can be used.

The controller 112 can also be implemented using a number of known database search engines. Likewise, controller 112 can be implemented as hardware or as software.

Figure 2A:
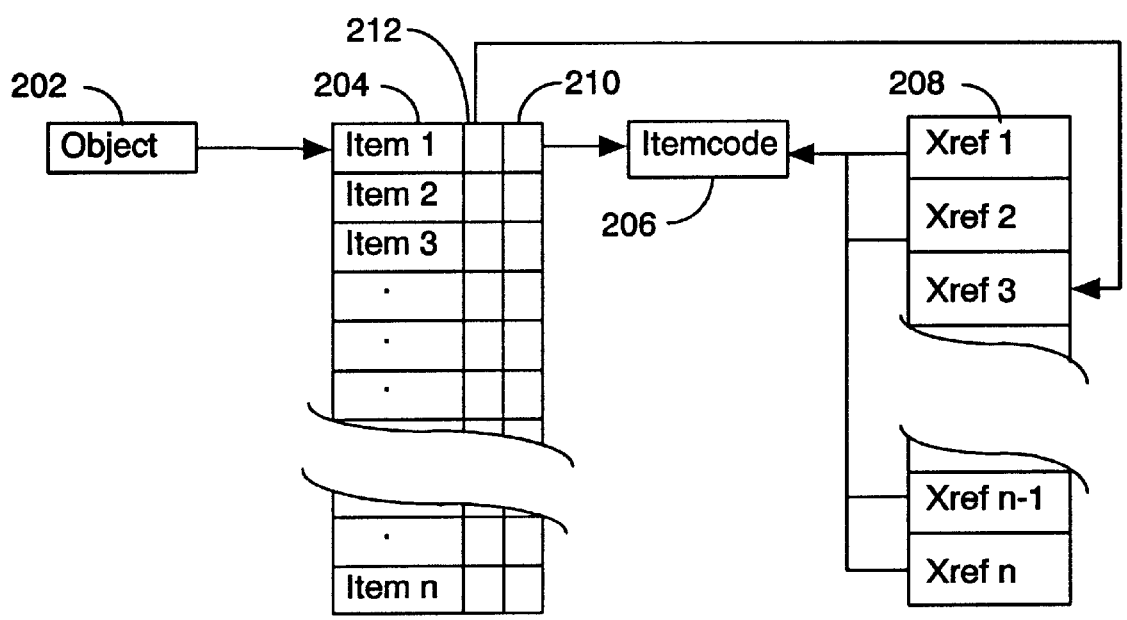
FIG. 2A is a block diagram illustrating the preferred embodiment of the restricted keyword list, the synonym list and their relationship to the underlying property item.

FIG. 2A illustrates the preferred embodiment of structures for the keyword list 106 and synonym list 108 and their relationship to the underlying object 202. Each object 202 in a database would be the listing for the underlying property (for example, a boat for sale or rent, etc.). Moreover, each object 202 would normally have many features such as a galley, engine number and type, communications equipment, etc. Each feature would have an entry in the item table 204 (from 1 to n) which contains a description. The description might be couch, sofa, settee, etc. The description entry would have both a pointer 212 to the synonym in xref table 208 that the user prefers, and a pointer 210 to the restricted keyword in itemcode 206. The itemcode 206 would contain a restricted keyword (for example, the term "sofa") from the restricted keyword list 106 discussed above in regard to FIG. 1.

Therefore, no matter what value the user may use to describe object 202, the itemcode 206 will have the same keyword stored in it. There will be one itemcode 206 for each restricted keyword used for searching purposes. While the preferred embodiment uses a table containing multiple itemcodes 206, only one entry in the table is shown for ease of illustration. The xref table 208 will also point to the itemcode 206 entry. Each xref entry in the xref table 208 will contain a synonym for the restricted keyword stored in the itemcode 206 and a pointer back to the itemcode 206.

Many itemcodes 206 have several xref 208 entries, each containing a synonym. These are the synonyms that the user is allowed to enter into a description field in the item table 204. These are also the synonyms used for a query operation. For example, the object 202 contains "couch" in the description field of the item table 204 used in the listing. In addition, it has a pointer in the item table 204 to the restricted keyword "sofa" in the itemcode 206. An xref table 208 will be set up if there is at least one synonym for a restricted keyword. For each synonym, there will be a pointer in its associated xref table 208 entry which points back to the itemcode. In this example, the xref table 208 entries may contain the terms "couch", "settee", etc. Therefore, the user (e.g., seller) can have "couch" in the description field, the person querying the system (e.g., buyer) can use the synonym "settee", and the controller 112 will use the term "sofa" in the itemcode 206 for the actual database search. As a result, the database search is independent of the keywords used by both the data entry operation and the data query operation.

The xref table 208 contains any synonyms for the restricted keyword stored in the itemcode 206. For example, "settee" and "couch" may be listed in the xref 1 and xref 2 fields respectively. Each entry in the xref table 208 would have a pointer back to the restricted keyword in the itemcode 206. When a user queries the database 114, the itemcodes 206 are checked to the entered keyword. If found, the restricted keyword stored in the itemcode 206 is used to search the database 114. If not found, the xref table 208 are checked. If a match is found in the xref table 208, then the restricted keyword in the itemcode 206 is obtained via the xref table 208 pointer.

As can be seen, the system allows users on both sides of the system to have flexible use of synonyms for search terms and for descriptions during data entry while ensuring that the actual searching is done with keywords stored in the itemcode 206 that are standardized for each particular feature in an object 202.

In addition to the keywords used to describe features, the item table 204 contains several other fields that elaborate on the features. For example, each entry in the item table would have quantity, size, unit of measure, manufacturer, model, description, etc. Of course, the types of additional data would be customized to suit a particular type of property (i.e., yachts, aircraft, real estate, etc.). In any case, these additional data are called keyword modifiers.

Figure 2B:
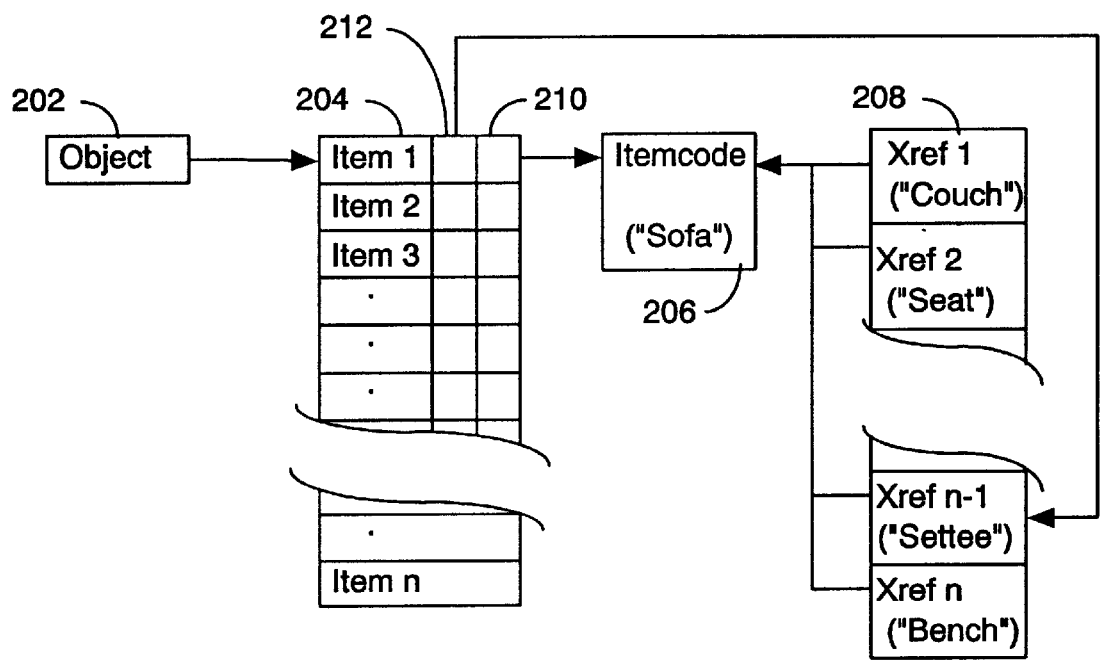
FIG. 2B is an example of the embodiment of FIG. 2A which shows a specific keyword "Sofa" and its synonyms.

FIG. 2B is an example of the embodiment of FIG. 2A with specific keywords in the itemcode 206 and synonym lists 208. In this figure, a restricted keyword "sofa" is stored in itemcode 206. Synonyms for the word "sofa", such as "couch", "settee", etc., are stored in the xref table 208. The item table 204 has an entry for each feature on the boat. The item table 204 entry includes a pointer 212 to the xref table 208 entry with the word selected by the user and a second pointer 210 which points to the restricted keyword that is used by the controller 212. In the preferred method of use, the entries in the xref table 208 are selected by a limited group of expert users who attempt to include any appropriate synonym.

Figure 3:
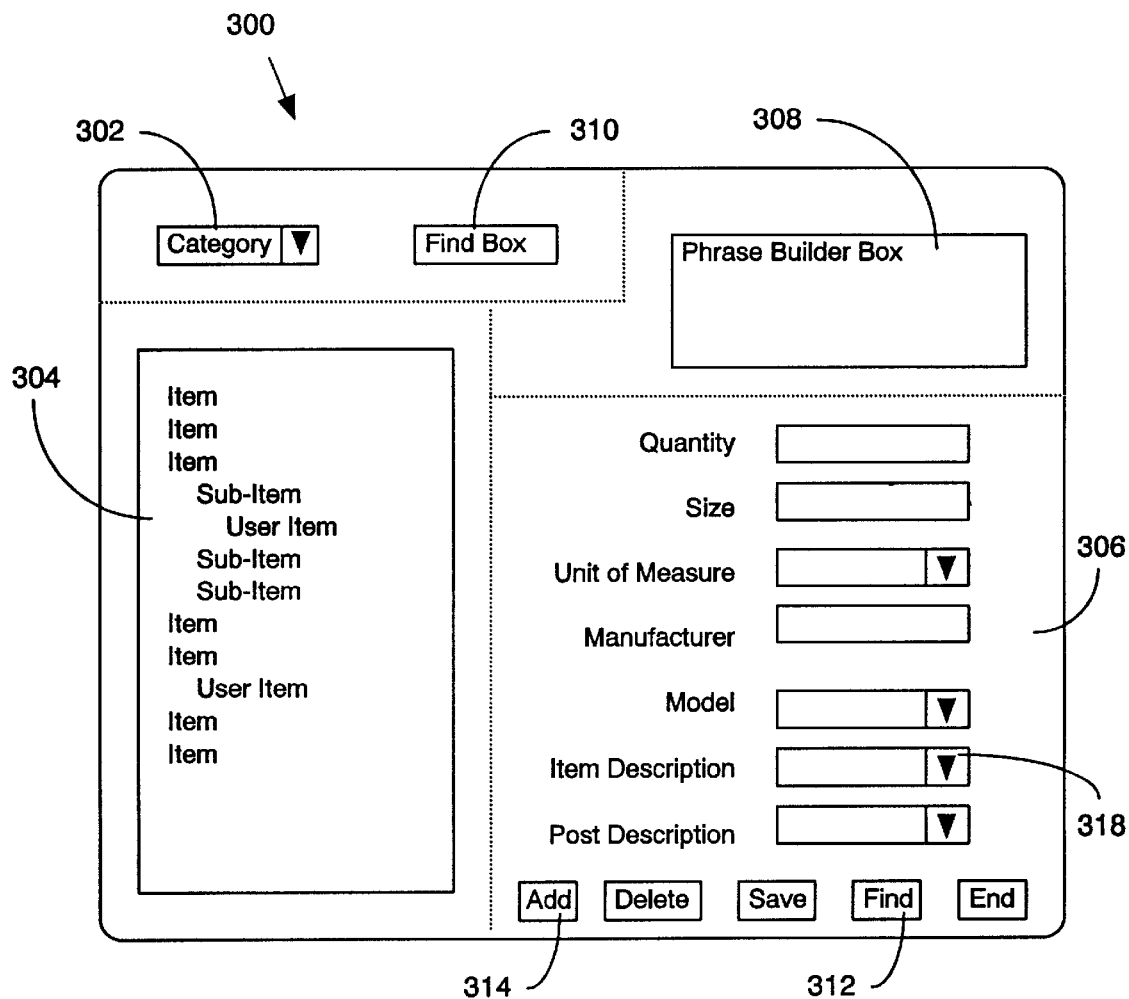
FIG. 3 is a diagram showing the layout of the data entry screen used in the preferred embodiment.

FIG. 3 shows a preferred embodiment of a data entry screen 300 used with the system discussed above in regard to FIGS. 1 and 2. The upper left quadrant of the screen has a drop down list of categories 302. Each itemcode 206 has a category associated with it which is stored with the itemcode 206 record. This category is used to narrow the list of possible items from which the user chooses. For example, in the case of homes, the categories may include rooms, accommodations, furnishings, entertainment, equipment, kitchen items, landscaping, etc. If the user selects accommodations, then items related to accommodations, such as closets, beds, and pillows can be entered, but not unrelated items such as lawn mowers or swimming pools. If the user selects finishing in the category menu, then items such as chairs and cushions can be added, but not garage or satellite dish. The structured nature of data entry using categories reduces the amount of items that a user must address for a particular feature and reduces the amount of time required to access the database. In addition, the system's visual presentation of categorized lists of qualified items acts as a memory jogger as well as it helps the user identify the appropriate context in which to use an item.

In the case of boats, the categories may include accommodations, deck, sails and rigging, or mechanical equipment. If the user selects accommodations, then items related to accommodations, such as closet, v-berth, and pillows can be entered, but not unrelated items such as generator or fishing chair. If the user selects deck in the category menu, then items such as life vests and cushions can be added, but not stove or mainsail. The structured nature of data entry using categories reduces the amount of items that a user must address for a particular feature and reduces the amount of time required to access the database.

The lower left quadrant of the data entry screen 300 contains the item list 304. The displayed item list 304 contains both the items that the user may add and the items that the user has already added. They are distinguished from each other by font and/or color. The item list 304 is organized in alphabetical order by item. It is further organized by sub-items for some, but not all items. The structure of the itemcode table 206 allows the software to group some alternative items together under a heading. In this case, the item is not an itemcode, but a heading for the sub-items which themselves are itemcodes. The heading item cannot be added to the description of the object 202, but the sub-items can be added. In the display, the sub-items related to a particular item are indented under their respective item heading. In the preferred embodiment, the user may double-click on an item heading to alternately display and hide the sub-items under the item heading.

In addition to the items and sub-items displayed in the item list 304, the itemcodes 206 that a user has added to the object description may be indented under the item name and displayed in a different color or font, etc. to denote those additions. The user selects the addition with the data entry mouse to modify it or delete it.

When a user selects an item by either the Add button 314 or by double clicking an item, it is added to the user's description of the boat. It is then selected and the itemcode appears in the item description entry field 318 in the lower right hand quadrant 306 of the data entry screen 300. The user can then enter modification values related to the particular item selected. The data entry fields in the lower right quadrant 306 are keyword modifiers which are used to more fully describe the particular item description. The keyword modifiers in this example are quantity, size, unit of measure, manufacturer, model, and post description. In the preferred embodiment, real-time updating of the phrase builder box 308 is used. During the real-time updates, the phrase builder box 308 is dynamically redisplayed each time a character in a keyword modifier is entered, deleted, modified or edited.

When an item is added, the item description is placed in the phrase builder box 308 (hereinafter text box 308) in the upper right quadrant of data entry screen 300. As modification values are added to the lower right hand quadrant 306, the phrase in the text box 308 is adjusted to build a more descriptive phrase. To demonstrate that the system is capable of displaying many types of property in addition to homes, table 1 illustrates the system as it could be used for boats. As an example, table 1 shows the effect of modifying the fishing chair entry.

TABLE 1

| FIELD NAME | USER ENTERS | PHRASE BUILDER BOX SHOWS |
|---|---|---|
| | Select "Fishing Chair" in the item list 304. | Fishing Chair |
| Quantity | 2 | 2 Fishing Chairs |
| Manufacturer | Pompano | 2 Pompano Fishing Chairs |
| Model | Model 300 | 2 Pompano Model 300 Fishing Chairs |

TABLE 1-continued

| FIELD NAME | USER ENTERS | PHRASE BUILDER BOX SHOWS |
|---|---|---|
| Post Description | adjustable lumbar | 2 Pompano Model 300 Fishing Chairs with adjustable lumbar |

It is important to remember that even though the entire textual description will be printed (or displayed) on the listing, the system will store and understand that the keyword (or itemcode 206) is a fishing chair. Another user who searches the database for a boat with a fishing chair will find this entry quickly, regardless of how elaborate the textual description has become. Of course, the same procedure would be used for other properties, such as a home. A feature, such as a television set, would also have related data such as the manufacturer, model number, cable readiness, etc. Likewise, properties such as avionics for aircraft would list features such as the make and model of the transponder, etc.

One advantage of using the structured form of data entry discussed above in regard to FIG. 3, is that it helps guide an inexperienced or semi-skilled user, or users from different countries or users with different languages, to enter a restricted set of keywords into an abstract inventory while simultaneously building a textual representation of the listing entry in the local language. This advantage allows the phrase builder box 308 to present a natural language description of the property by automatically constructing the phrase from the individual data items in the property record to form a complete sentence from the individual keyword and its modifiers. When the property is displayed or printed, all of the automatically generated natural language phrases are used together to construct a natural language document describing the property.

An additional feature of the preferred embodiment is the ability to switch the item description to the plural form when the property contains more than one of the item. In the second row of the example in Table 1, the user entered a Quantity of 2, and the description is dynamically adjusted to the plural form. In the preferred embodiment, the quantity may also be indicated by a Many-flag. There are some items that are present in quantity, but generally not counted, or not yet counted when the data is entered. A house, for example, may have an unknown quantity of cable TV outlets but known to be more than one. The user selects the Many-flag by setting the Many-flag toggle box 316 instead of directly indicating a numerical quantity. The Many-flag indicates a non-specific plural quantity amount. When the Many-flag is set, the software will display and print the plural form of the itemcode.

Another advantage of the preferred embodiment is item sensitive help. Table 2 shows the implementation of the item sensitive help database table with some examples as they might apply to a boat listing system. In this example, when the user adds a stove, a down arrow will appear next to the model keyword modifier entry box and next to the post description entry box in display quadrant 306. If the user then clicks on the down arrow to the right of the model box, a dialog will display the word "gimbaled" with a check box in front of it. If the user checks the check box with his mouse and clicks OK for the dialog, then the word "gimbaled" will show up in the model entry box in the lower right hand quadrant 306. If he picks the down arrow to the right of the post description entry box, a dialog will open up showing check boxes for oven and auto fuel shutoff. If the user then selects both check boxes, the post description will read "w/oven, auto fuel shut off" and the phrase builder box 308 will display "gimbaled stove w/oven, auto fuel shut off."

TABLE 2

| ITEMCODE | MODIFIER | GROUP | XCLUSIVE | OPTION |
|---|---|---|---|---|
| stove | model | 1 | N | gimbaled |
| stove | post | 1 | N | oven |
| stove | post | 1 | N | auto fuel shut off |

The Xclusive column in the database table demonstrated in table 2 is Y (yes) for a group in which the help options are mutually exclusive. A radio, for example, may have multi-band and single-band in the model help group. It would be marked Y in the Xclusive column since the radio could be multi-band or single-band, but not both. The dialog for the help in this case would put radio buttons next to the help options, so that the user could select one or the other, but not both.

Another advantage of the system's implementation of item sensitive help is its ability to provide the user with unit of measure options that are compatible with the item that is being entered or modified. For example, when the user adds a "sail" item, a down arrow will appear next to the unit of measure keyword modifier entry box. If the user then enters a size and clicks on the down arrow to the right of the unit of measure box, a dialog will display a list of appropriate unit of measure options such as square meters.

Also shown in the upper left comer of the data entry screen 300 is a find box 310. The list of items in the item list 304 may optionally be organized in alphabetical order or by some other technique. If the list is extensive, or the user is unable to find the desired entry, the user may use the find box 310 to search the synonyms in the xref table 208.

For example, a user may wish to add the term "toilet" to the list of items. If the item cannot be found, the term toilet is entered into the find box 310. The find button 312 is then selected. The itemcodes 206 table and the xref table 208 are then searched for a match using any conventional technique for matching terms, such as stem searching, phonetic scoring, etc. The search results are then displayed for the user, who would determine that the keyword "head" was the appropriate itemcode term. This function allows the user to perform a dialect-equivalency search with the keyword tables. As a result, even semi-skilled users can produce data entries and data queries using the correct terminology. A data entry is an item entered into a record in the database, whereas a data query is an item being searched in the database.

Another feature of the software is that the list of items in the item list 304 is pre-selected and pre-sorted. When the user selects a category from the category box 302, the list of items displayed in the item list 304 is limited to those items which are appropriate to that category. A novel feature used for this portion of the system is that the list is dynamically altered based on previous selections, such that only a subset of items which are appropriate at that time are displayed.

For example, if the user had previously entered a feature of the boat, such as boat type and length, the list of items displayed in 304 would be restricted to a list of items appropriate to that kind and length of boat, and also restricted by the category selection in category box 302. If the user had previously entered that the type of boat was a "sailboat", then the item list for the sail inventory category would include the keyword "sail". However, if the boat was previously listed as a power boat then the keyword "sail" would not appear in subsequent item lists. Similarly, in a real estate system, if the user had entered a 3-floor townhouse, the keyword "elevator" might appear on the item list for the amenities category. Elevator would not appear, though, if the user had previously entered that the house was only a single-story house. In summary, an advantageous feature of the invention is that the keyword entries in the item list 304 are dynamically selected based on previous inputs about the object being described.

The preferred embodiment is implemented using an Event-driven Graphical User Interface, the operation is described with the following table 3 (which is explained in conjunction with FIG. 3), rather than flow diagrams.

TABLE 3

| EVENT | DESCRIPTION |
|---|---|
| Click on down arrow in category box 302. | Display the drop down category list box which contains distinct categories from the itemcode table 206. |
| Click on one category in the category box 302. | In list box 304, display items from itemcode 206 table where the category is equal to the selected category. |
| Character(s) typed in the Findbox 310. | Enable the Find button 312 |
| Click find button 312. | IF characters have been entered in the find box 310, THEN     Open a (child) dialog box, called "Find Dialog" containing a list box (the "Find Dialog" is explained below in regard to table 3).     Display in list box: Select description from itemcode table where "find string" is contained in the description, union select description from the xref table where "find string" is contained in the description.     Transfer active control to "Find Dialog". ELSE     Notify user to enter a string in the Find Box. |
| Click item in Item Box 304. | Highlight item in display. IF item is a heading for sub-items, THEN     IF sub-items are displayed,     THEN         Hide the sub-items, redraw the list 304.     ELSE         Display the sub-items, redraw the list 304. |
| Double click item. | IF item is a heading for sub-items, THEN     IF sub-items are displayed,     THEN         Hide the sub-items, redraw the list     ELSE         Display the sub-items, redraw the list. ELSE     Add an items record for the selected item.     Redisplay the item list to include the user-item.     Highlight the user-item just selected.     Put the item description in the item description entry box.     IF the item has any entries in the xref table,     THEN         Attach a down arrow to the item description entry box.     IF the item has item sensitive help,     THEN         Attach down arrows to the modifier entry box for each field that has help for this item.     Update the phrase builder box 308. |
| Click sub-item. | Highlight sub-item. |
| Double click sub-item. | Add an item record for the selected item. Redisplay the item list to include the user-item. Highlight the user-item just selected. Put the item description in the item description entry box. IF the item has any entries in the xref table, THEN     Attach a down arrow to the item description entry box. IF the item has item sensitive help, THEN     Attach down arrows to the modifier entry box for each field that has help for this item. Update the phrase builder box 308. |

TABLE 3-continued

| EVENT | DESCRIPTION |
|---|---|
| Click user-item. | Display columns from item table in the entry boxes in the lower right quadrant 306.<br>IF the item points to an xref record,<br>    THEN<br>    Display the description from the xref record in the item description entry box<br>IF quantity >1 OR many flag is set<br>    THEN Look up the plural form of the description (itemcode of xref as appropriate).<br>    Display the plural form in the item description entry box.<br>Update the phrase builder box 308. |
| When a number is entered in the quantity entry box. | IF (quantity >1 OR many flag is set) AND description field is not in the plural form,<br>    THEN<br>    Look up the plural form of the description (item code or xref as appropriate).<br>    Display the plural form in the item description entry box.<br>Update the phrase builder box 308. |
| Characters entered in any of the entry boxes (except quantity) in the lower right quadrant 306. | Update the phrase builder box 308. |
| Click add button | (Only enabled if an item or a sub-item is highlighted on the left and there is text in the item description entry box.)<br>Insert a record into the item table using the information in the entry fields in the lower right quadrant 306.<br>Redisplay the item selection list to include the new user-item.<br>Highlight the new user-item in the selection list. |
| Click delete button | (Only enabled if a user-item is highlighted on the left and displayed in the item description entry box.)<br>Delete the corresponding item from the item table. |
| Click save button. | (Only enabled if a user-item is highlighted on the left and the user has changed any of the fields on the right.)<br>Update the corresponding item in the item table with the new information from the entry fields in the lower left quadrant. |
| Click item help down arrow. | Open Item Sensitive Help Dialog as explained in table 5. |

Table 4 illustrates the "Find dialog" used for word selection in the preferred embodiment.

TABLE 4

| EVENT | ACTION |
|---|---|
| Initial. | Search itemcode 206 table for any description that contains or otherwise matches the words in the entry "Find Box" 310.<br>List the descriptions in the list box of the "Find dialog". Search xref table for any description that contains or otherwise matches the words in the entry "Find Box". List these descriptions in the list box of the "Find dialog" using a different color. |
| Click on one of the items in the list. | Highlight the item. |
| Double click one of the items in the list. | Scroll the item list 304 selections (on the min screen) to the item which corresponds to the selected item in the "Find dialog".<br>If the selected item in the "Find dialog" is an xref entry, then scroll to the item to which the xref entry points. |
| Click OK button. | If an item is highlighted, then scroll the item list selections (on the main screen) to the item which corresponds to the selected item in the "Find dialog". If the selected item in the |

TABLE 4-continued

| EVENT | ACTION |
|---|---|
| | "Find dialog" is an xref entry, then scroll to the item to which the xref entry points. |

Table 5 illustrates the Item Sensitive Help Dialog used for word selection in the preferred embodiment.

TABLE 5

| EVENT | ACTION |
|---|---|
| Initial | Select from the item sensitive help table, the options corresponding to the itemcode and field of the parent dialog 300.<br>Draw a line between each group.<br>IF the group is marked with a Y in the Xclusive column,<br>    THEN<br>    Put radio buttons in front of each option in the group.<br>    ELSE<br>    Put check boxes in front of each option of the group. |
| OK | For each checked option, put the selected option in the entry box of the parent dialog box 300.<br>Redisplay the phrase builder box 308. |

Another advantage of the invention is the ability, discussed above, to automatically adjust the words in the phrase builder box 308 to indicate plural or singular form. Since the phrase builder box 308 shows the textual description which will be printed and/or read by those searching for properties, the automatic conversion to the appropriate form of a word enhances readability for the user. The textual output of the system, which fully describes the property, appears to be in natural language format, even though the description of the object has been structured into a normalized database.

The invention has another feature that improves the usefulness of the textual output of the system. When the system is used in a network of devices that are remote from each other, making queries and searching the database, each user can set on his own local device a "dialectal preference". The itemcode and xref synonyms associated with an itemcode constitute a set of descriptions. In accordance with one aspect of the invention, the user can specify which one of the set of descriptions is the preferred display for the local device. Whenever the property description is displayed or printed, the invention will choose the item description that has been marked as local "dialectal preference" instead of the description that was entered in the database.

For example, an entry for a house in the United States may have a "den". However, a broker in Great Britain may indicate that term "drawing room" should always be used for this particular itemcode. In such a case, the device in Great Britain will always display a house as having a drawing room, even though the data was originally enter in the United States with a den.

Figure 4A:
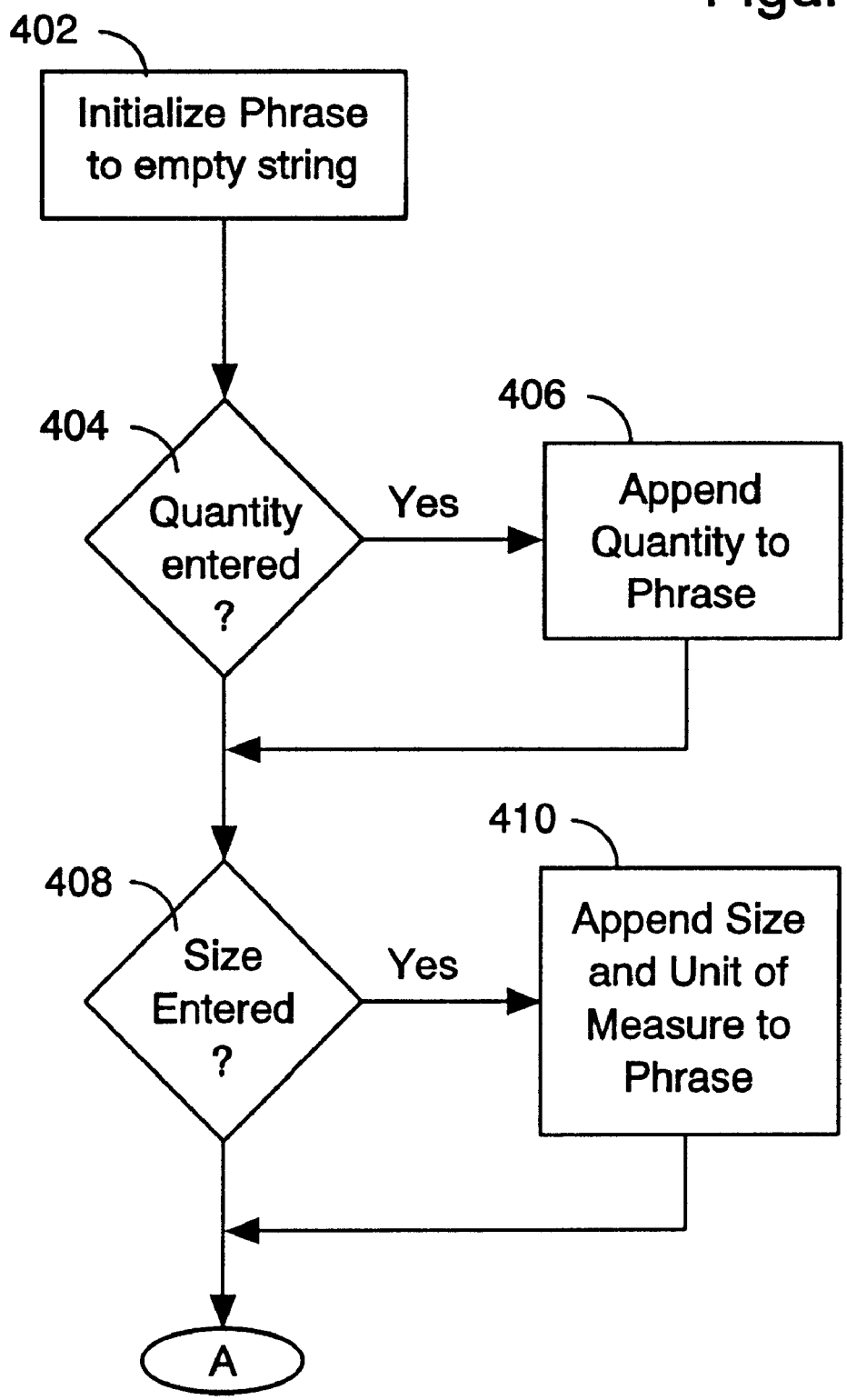
FIGS. 4A and 4B comprise a flow diagram which illustrates the realtime process of updating the phrase display.
Figure 4B:
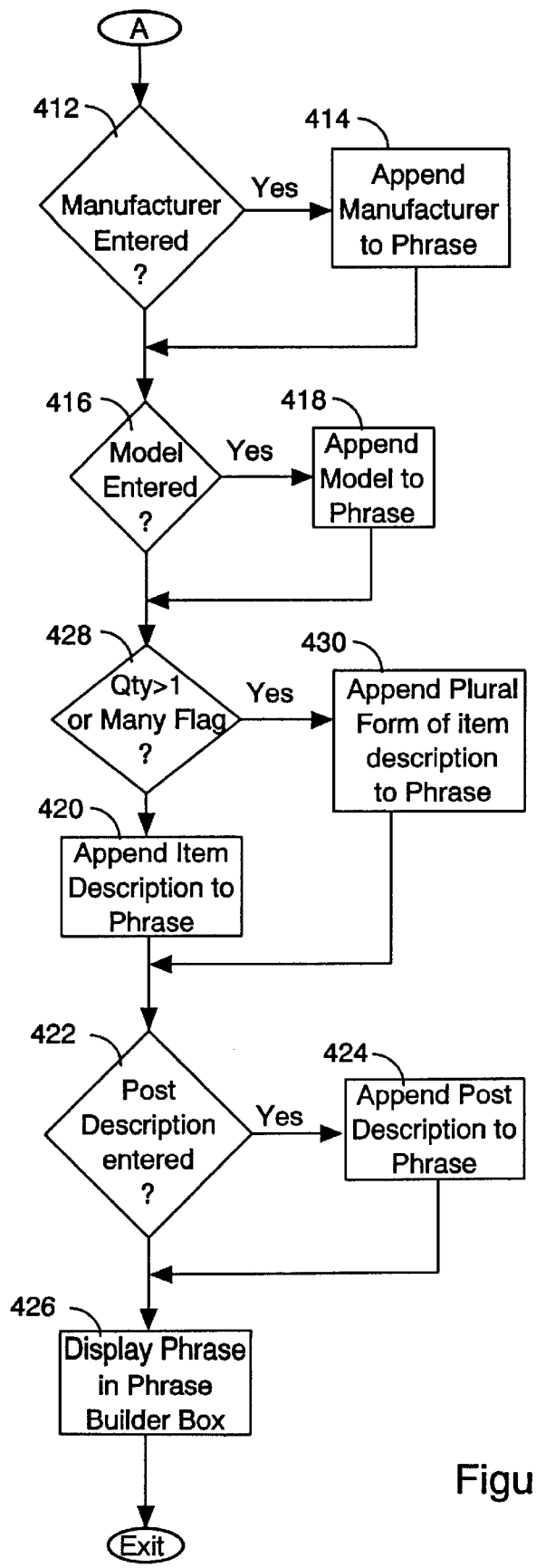

FIGS. 4A and 4B illustrate the method used by the preferred embodiment to update the phrase builder box 308 in response to keystrokes as they are entered by the user. As was done above, a database related to boats is used for ease of illustration. However, the system works equally well for any kind of property. In step 402, the phrase is initialized to an empty state prior to constructing a new phrase. For each feature, an item description is created. If a quantity was entered for an item, or if the Many-flag was set, then it would be tested in step 404 and appended to the item description in step 406. If a size is appropriate, then the size would be tested in step 408 and the item description updated in step 410. If the manufacturer identity is appropriate, then the manufacturer identification would be tested in step 412 and the item description updated in step 414. The model numbers would be added to the item description in steps 416 and 418 in like fashion. When the item description is complete, it would be appended to the phrase in step 420. Post descriptions are features which may be added to the description of an item. These would be tested in step 422 and added to the phrase in step 424. In step 426, the phrase display would be updated.

When a complete description of the property is to be printed or displayed, all the phrases that would be generated as described in FIG. 4A and 4B are assembled together into a natural language paragraph. In the preferred embodiment, the description is further divided into several paragraphs organized by the category of the keywords, but other arrangements are possible that are within the spirit of the invention.

In one alternative embodiment, the actual item description displayed in step 420 or 430 would be chosen according to the dialectal-preference that the user had previously established for his system. In another alternative embodiment, the process described in FIG. 4 will be adapted to multiple languages by reordering the steps according to the grammatical rules of the user-preferred language.

Figure 5A:
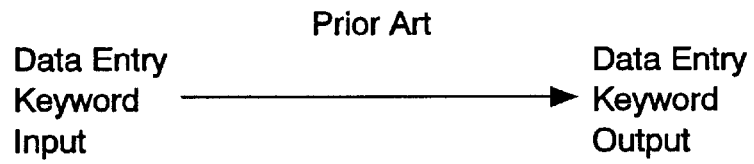
FIG. 5A illustrates the data entry process in prior art systems.
Figure 5B:
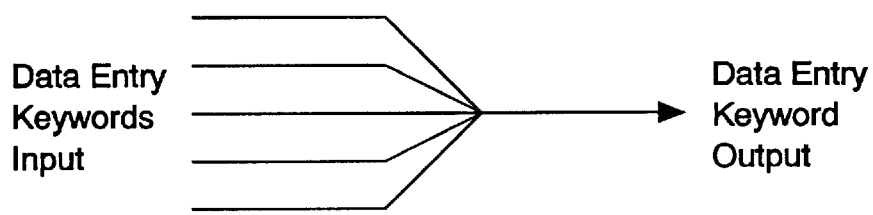
FIG. 5B illustrates the data entry process in the preferred embodiment.

FIGS. 5A and 5B illustrate a difference between data entry in prior art systems versus the preferred embodiment. In FIG. 5A the data entry process in prior art systems is shown. Data entered in prior systems is input to the database as written. FIG. 5B illustrates the data entry process in the preferred embodiment. In the preferred embodiment, keywords input to the database are screened to determine if they are to be directly input into the database or be substituted with a synonym keyword. As can be seen, multiple keywords result in a single searchable keyword being stored in the database.

Figure 5C:
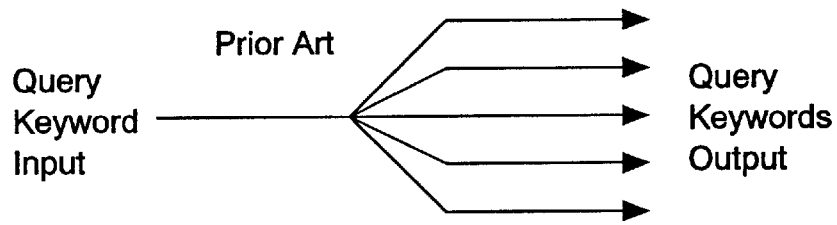
FIG. 5C illustrates the data query process in prior art systems.
Figure 5D:
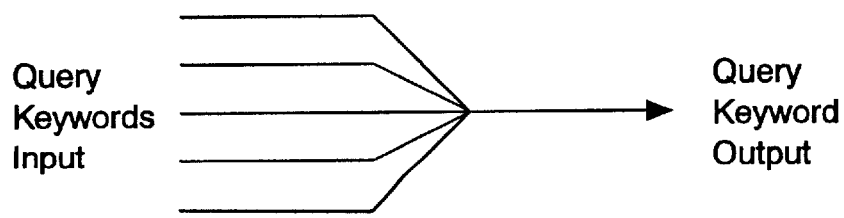
FIG. 5D illustrates the data query process in the preferred embodiment.

FIGS. 5C and 5D illustrate a difference between data query in prior art systems versus the preferred embodiment. In FIG. 5C the data entry process in prior art systems is shown. Data entered in prior systems is input to the system and expanded into multiple keywords prior to use by the controller 112. This is accomplished by a variety of known techniques, such as stem expansion. As a result, the performance of prior art search engines is degraded by the need to search for multiple keywords. FIG. 5D illustrates the data query process in the preferred embodiment. In the preferred embodiment, query keywords input to the database are screened to determine if they are to be directly used or be substituted with a synonym keyword. As can be seen, multiple keywords result in a single searchable keyword being used to query the database.

A principal advantage of the keyword substitution method used in the preferred embodiment is that it increases the number of hits made during a search. The reason for this is the elimination of missed hits due to poor user selection of keywords on both the data input and data query sides of the database.

Another advantage of the keyword substitution method is that it provides improved performance due to the use of searching for only a single keyword in the database instead of many synonyms.

Another advantage of the keyword substitution method is that it gives users the option to create and to retrieve fully qualified expressions that make use of dialectal keywords. The system uses a restricted keyword list internally, but allows the user to customize the description according to a personal preference or the preferences of the user's target audience.

A further advantage of the system is dynamic item selection. In particular, dynamic item selection reduces the number of items which a user can select from based on a previous selection by the user. For example, in regard to features that are dependent on other aspects of a property (such as the elevator, discussed above, which are dependent on the number of floors of the property), subsequent screens will display only items which are possible based on the previous selection. Automatic plural selection is an advantage which provides a more readable listing phrase for the convenience of the user.

While the invention has been described with respect to a preferred embodiment thereof, it will be understood by those skilled in the art that various changes in detail may be made therein without departing from the spirit, scope, and teaching of the invention. For example, the keyword translator can be implemented separately for the data input and data query operations, the structure of the database can vary, the display presentations can vary, etc. The type of information or property can vary. Various features of the system can be implemented in hardware or software. Further, the database can be implemented in a variety of ways. For example, it can be stored on hard disk, CD-ROM, magnetic tape, distributed on a network, etc. Accordingly, the invention herein disclosed is to be limited only as specified in the following claims.

We claim:

1. A database system, further comprising:

a database;

at least one data entry input for entering data records;

a restricted keyword list, having a limited set of restricted keywords used as input for database searching;

a synonym keyword list, having an expanded set of synonym keywords, each synonym keyword related to a corresponding restricted keyword;

at least one keyword translator, further comprising:
 input means to accept the data record input by the data entry input;
 means to compare the data record with restricted keywords in the restricted keyword list and the synonym keyword list;
 means to select the restricted keyword when the data record contains the restricted keyword or its corresponding synonym keyword;
 means to output the restricted keyword selected by the keyword translator;

a database controller, further comprising:
 means to input the restricted keyword output by the keyword translator;
 means to update the database with the restricted keyword selected by the keyword translator.

2. A system, as in claim 1, wherein the synonym list includes keywords from more than one dialect.

3. A system, as in claim 1, wherein the synonym list includes at least one keyword in plural and singular forms.

4. A system, as in claim 3, further comprising:

means to recognize data input which indicates a non-specific plural quantity value, and means to set a many flag when the non-specific plural quantity value is detected; and means to select the plural form of the keyword from the synonym list when the many flag is set.

5. A system, as in claim 1, further comprising:

means to display a list of available keywords for selection by a user; and means to limit subsequent lists of available keywords based on previously entered data.

6. A system, as in claim 5, further comprising:

means to display a list of help menu data for selection by a user; and means to limit subsequent lists of help menu data based on the previously selected keyword.

7. A system, as in claim 1, further comprising:

means to display a phrase containing the keywords input by the user; and means to update the phrase each time a keyword modifier related to a keyword is entered by the user.

8. A system, as in claim 7, wherein the phrase is formed in a natural language form.

9. A system, as in claim 2, further comprising:

the synonym list includes at least one keyword in plural and singular forms;

means to recognize data input which indicates a non-specific plural quantity value, and means to set a many flag when the non-specific plural quantity value is detected; and means to select the plural form of the keyword from the synonym list when the many flag is set.

10. A system, as in claim 2, further comprising:

means to display a phrase containing the keywords input by the user;

means to update the phrase each time a keyword modifier related to a keyword is entered by the user; and means to form the phrase in a natural language form.

11. A system, as in claim 2, further comprising:

means to display a list of available keywords for selection by a user; and means to limit subsequent lists of available keywords based on previously entered data.

12. A system, as in claim 11, further comprising:

means to display a list of help menu data for selection by a user; and means to limit subsequent lists of help menu data based on the previously selected keyword.

13. A system, as in claim 9, further comprising:

means to display a list of available keywords for selection by a user;

means to limit subsequent lists of available keywords based on previously entered data;

means to display a list of help menu data for selection by a user; and means to limit subsequent lists of help menu data based on the previously selected keyword.

14. A system, as in claim 13, further comprising:

means to display a phrase containing the keywords input by the user;

means to update the phrase each time a keyword modifier related to a keyword is entered by the user; and means to form the phrase in a natural language form.

15. A system, as in claim 1, further comprising:

at least one query input for entering data queries;

the keyword translator further comprises:
 input means to accept the data query input by the query input;
 means to compare the data query with restricted keywords in the restricted keyword list and the synonym keyword list;
 means to select the restricted keyword when the data query contains the restricted keyword or its corresponding synonym keyword;
 means to output the restricted keyword selected by the keyword translator;

the database controller further comprises:
 means to search the database with the restricted keyword selected by the keyword translator;
 means to output database records located by the search;

at least one query output for displaying data query results output by the data controller.

16. A system, as in claim 15, wherein the synonym list includes keywords from more than one dialect.

17. A system, as in claim 15, wherein the synonym list includes at least one keyword in plural and singular forms.

18. A system, as in claim 17, further comprising:

means to recognize data input which indicates a non-specific plural quantity value, and means to set a many flag when the non-specific plural quantity value is detected; and means to select the plural form of the keyword from the synonym list when the many flag is set.

19. A system, as in claim 15, further comprising:

means to display a list of available keywords for selection by a user; and means to limit subsequent lists of available keywords based on previously entered data.

20. A system, as in claim 19, further comprising:

means to display a list of help menu data for selection by a user; and means to limit subsequent lists of help menu data based on the previously selected keyword.

21. A system, as in claim 15, further comprising:

means to display a phrase containing the keywords input by the user; and means to update the phrase each time a keyword modifier related to a keyword is entered by the user.

22. A system, as in claim 21, wherein the phrase is formed in a natural language paragraph form.

23. A system, as in claim 16, further comprising:

the synonym list includes at least one keyword in plural and singular forms;

means to recognize data input which indicates a non-specific plural quantity value, and means to set a many flag when the non-specific plural quantity value is detected; and means to select the plural form of the keyword from the synonym list when the many flag is set.

24. A system, as in claim 16, further comprising:

means to display a phrase containing the keywords input by the user;

means to update the phrase each time a keyword modifier related to a keyword is entered by the user; and means to form the phrase in a natural language paragraph form.

25. A system, as in claim 16, further comprising:

means to display a list of available keywords for selection by a user; and means to limit subsequent lists of available keywords based on previously entered data.

26. A system, as in claim 25, further comprising:

means to display a list of help menu data for selection by a user; and means to limit subsequent lists of help menu data based on the previously selected keyword.

27. A system, as in claim 23, further comprising:

means to display a list of available keywords for selection by a user;

means to limit subsequent lists of available keywords based on previously entered data;

means to display a list of help menu data for selection by a user; and means to limit subsequent lists of help menu data based on previously selected keyword.

28. A system, as in claim 27, further comprising:

means to display a phrase containing the keywords input by the user;

means to update the phrase each time a keyword modifier related to a keyword is entered by the user; and means to form the phrase in a natural language paragraph form.

29. A database query system, further comprising:

a database;

at least one query input for entering data queries;

a restricted keyword list, having a limited set of restricted keywords used as input for database searching;

a synonym keyword list, having an expanded set of synonym keywords, each synonym keyword related to a corresponding restricted keyword;

at least one keyword translator, further comprising:

input means to accept the data record input by the query input;

means to compare the data record with restricted keywords in the restricted keyword list and the synonym keyword list;

means to select the restricted keyword when the data record contains the restricted keyword or its corresponding synonym keyword;

means to output the restricted keyword selected by the keyword translator;

a database controller, further comprising:

means to search the database with the restricted keyword selected by the keyword translator;

means to output database records located by the search;

at least one query output for displaying data query results output by the data controller.

30. A system, as in claim 29, wherein the synonym list includes keywords from more than one dialect.

31. A system, as in claim 29, wherein the synonym list includes at least one keyword in plural and singular forms.

32. A system, as in claim 31, further comprising:

means to recognize data input which indicates a non-specific plural quantity value, and means to set a many flag when the non-specific plural quantity value is detected; and means to select the plural form of the keyword from the synonym list when the many flag is set.

33. A system, as in claim 29, further comprising:

means to display a list of available keywords for selection by a user; and means to limit subsequent lists of available keywords based on previously entered data.

34. A system, as in claim 33, further comprising:

means to display a list of help menu data for selection by a user; and means to limit subsequent lists of help menu data based on the previously selected keyword.

35. A system, as in claim 29, further comprising:

means to display a phrase containing the keywords input by the user; and means to update the phrase each time a keyword modifier related to a keyword is entered by the user.

36. A system, as in claim 35, wherein the phrase is formed in a natural language paragraph form.

37. A system, as in claim 30, further comprising:

the synonym list includes at least one keyword in plural and singular forms;

means to recognize data input which indicates a non-specific plural quantity value, and means to set a many flag when the non-specific plural quantity value is detected; and means to select the plural form of the keyword from the synonym list when the many flag is set.

38. A system, as in claim 31, further comprising:

means to display a phrase containing the keywords input by the user;

means to update the phrase each time a keyword modifier related to a keyword is entered by the user; and means to form the phrase in a natural language form.

39. A system, as in claim 30, further comprising:

means to display a list of available keywords for selection by a user; and means to limit subsequent lists of available keywords based on previously entered data.

40. A system, as in claim 39, further comprising:
   means to display a list of help menu data for selection by a user; and
   means to limit subsequent lists of help menu data based on the previously selected keyword.

41. A system, as in claim 37, further comprising:
   means to display a list of available keywords for selection by a user;
   means to limit subsequent lists of available keywords based on previously entered data;
   means to display a list of help menu data for selection by a user; and
   means to limit subsequent lists of help menu data based on the previously selected keyword.

42. A system, as in claim 41, further comprising:
   means to display a phrase containing the keywords input by the user;
   means to update the phrase each time a keyword modifier related to a keyword is entered by the user; and
   means to form the phrase in a natural language form.

43. A method of creating and accessing a database with a restricted set of keywords, including the steps of:
   using a database to store data records;
   entering update data with at least one data entry input;
   entering a data query with at least one query input;
   comparing the update data with restricted keywords from a restricted keyword list and selecting the restricted keyword when a match occurs;
   using a synonym list which contains synonyms that correspond to restricted keywords in the restricted keyword list;
   using at least one keyword translator to translate update data and data queries to restricted keywords, including the following steps:
      comparing the update data with synonym keywords from the synonym keyword list when the update data does not match any keywords in the restricted keyword list and selecting the corresponding restricted keyword when a match occurs;
      comparing the data query with synonym keywords from the synonym keyword list when the update data does not match any keywords in the restricted keyword list and selecting the corresponding restricted keyword when a match occurs;
      outputting the selected restricted keyword;
   searching the database with a database controller, including the further steps of:
      inputting the selected restricted keyword output by the keyword translator;
      accessing the database with the restricted keyword selected by the keyword translator.

44. A method, as in claim 43, including the further step of including keywords from more than one dialect in the synonym list.

45. A method, as in claim 43, including the further step of including at least one keyword in plural and singular forms in the synonym list.

46. A method, as in claim 45, including the further steps of:
   inputting non-specific plural quantity values;
   setting a many flag when the non-specific plural quantity value is detected; and
   selecting the plural form of the keyword from the synonym list when the many flag is set.

47. A method, as in claim 43, including the further steps of:
   displaying a list of available keywords for selection by a user; and
   limiting subsequent lists of available keywords based on previously entered data.

48. A method, as in claim 47, including the further steps of:
   displaying a list of help menu data for selection by a user; and
   limiting subsequent lists of help menu data based on the previously selected keyword.

49. A method, as in claim 45, including the further steps of:
   displaying a phrase containing the keywords input by the user; and
   updating the phrase each time a keyword modifier related to a keyword is entered by the user.

50. A method, as in claim 49, including the further step of forming the phrase in a natural language form.

51. A method, as in claim 44, including the further steps of:
   including at least one keyword in plural and singular forms in the synonym list;
   recognizing data input which indicates a non-specific plural quantity value;
   setting a many flag when the non-specific plural quantity value is detected; and
   selecting the plural form of the keyword from the synonym list when the many flag is set.

52. A method, as in claim 45, including the further steps of:
   displaying a phrase containing the keywords input by the user;
   updating the phrase each time a keyword modifier related to a keyword is entered by the user; and
   forming the phrase in a natural language form.

53. A method, as in claim 44, including the further steps of:
   displaying a list of available keywords for selection by a user; and
   limiting subsequent lists of available keywords based on previously entered data.

54. A method, as in claim 53, including the further steps of:
   displaying a list of help menu data for selection by a user; and
   limiting subsequent lists of help menu data based on the previously selected keyword.

55. A method, as in claim 51, including the further steps of:
   displaying a list of available keywords for selection by a user;
   limiting subsequent lists of available keywords based on previously entered data;
   displaying a list of help menu data for selection by a user; and
   limiting subsequent lists of help menu data based on the previously selected keyword.

56. A method, as in claim 55, including the further steps of:
   displaying a phrase containing the keywords input by the user;

updating the phrase each time a keyword modifier related to a keyword is entered by the user; and forming the phrase in a natural language paragraph form.

57. A method for selecting a restricted keyword for use with a database, comprising the steps of:

receiving information including at least one user-entered keyword relating to data in a database;

comparing the user-entered keyword with a list of restricted keywords to determine whether there exists in the list of restricted keywords a matching restricted keyword which matches the user-entered keyword;

selecting the matching restricted keyword for use with the database when a restricted keyword in the list of restricted keywords matches to the user-entered keyword;

comparing the user-entered keyword with a list of synonyms when there is not a matching restricted keyword in the list of restricted keywords corresponding to the user-entered keyword to determine whether there exists in the list of synonyms, a matching synonym corresponding to the user-entered keyword, each synonym is associated with a restricted keyword; and selecting a restricted keyword associated with the matching synonym for use with the database if there does not exist a matching restricted keyword and there exists a synonym matching to the user-entered keyword.

58. A method, as in claim 57, including the further step of searching for the selected restricted keyword in the database.

59. A method, as in claim 57, including the further step of entering the corresponding restricted keyword in the database.

60. A method, as in claim 57, including the further step of providing a user prompt requesting a user to enter a different keyword, if there does not exist a matching restricted keyword and there does not exist a matching synonym corresponding to the user-entered keyword.

61. A method, as in claim 58, including the further step of using synonyms from more than one dialect.

62. A method, as in claim 57, including the further steps of:

displaying a list of available keywords from the restricted keyword list for selection by a user; and limiting the displayed list of available keywords based on previously entered data.

63. A method, as in claim 58, including the further steps of:

receiving from a user a dialectal preference for the restricted keyword indicating which of the set of restricted keywords, and its associated synonyms is preferred by the user for display; and displaying the user-preferred restricted keyword or associated synonym.

64. A method, as in claim 59, including the further step of displaying a list of item sensitive help values for keyword modifiers wherein the displayed list depends on the selected keyword.

65. A method, as in claim 59, including the further steps of:

displaying a phrase containing the keywords entered by the user;

redisplaying the phrase when a keyword modifier related to a keyword is entered by the user; and redisplaying the phrase when a keyword modifier is changed by the user.

66. A method, as in claim 65, including the further steps of:

receiving a quantity value related to at least one of the keywords from the user; and displaying the plural form of the selected keyword when the quantity received is more than one.

67. A method, as in claim 66, including the further steps of:

receiving a non-specific plural quantity value from the user;

entering a many-flag in the database when the non-specific plural quantity value is detected; and displaying the plural form of the selected keyword when the many-flag is entered.

68. A method, as in claim 66, including the further step of displaying the keywords and keyword modifiers associated with a data object in natural language form.

69. A system for selecting a restricted keyword for use with a database, comprising:

means for receiving information including at least one user-entered keyword relating to data in a database;

means for comparing the user-entered keyword with a list of restricted keywords to determine whether there exists in the list of restricted keywords a matching restricted keyword corresponding to the user-entered keyword;

means for selecting the matching restricted keyword for use with the database when there is a restricted keyword in the list of restricted keywords matching the user-entered keyword;

means for comparing the user-entered keyword with a list of synonyms when there is not a matching restricted keyword in the list of restricted keywords corresponding to the user-entered keyword to determine whether there exists in the list of synonyms a matching synonym corresponding to the user-entered keyword, each synonym associated with a restricted keyword; and means for selecting a restricted keyword associated with the matching synonym, for use with the database, when there does not exist a matching restricted keyword and there exists a synonym corresponding to the user-entered keyword.

70. A system, as in claim 69, further comprising means for searching for the selected restricted keyword in the database.

71. A system, as in claim 69, further comprising means for entering the selected restricted keyword in the database.

72. A system, as in claim 69, further comprising means for providing a user prompt requesting a user to enter a different keyword if there does not exist a matching restricted keyword and there does not exist a matching synonym corresponding to the user-entered keyword.

73. A system, as in claim 69, wherein the synonym list includes keywords from more than one dialect.

74. A system, as in claim 69, wherein the keyword list includes at least one keyword in plural and one keyword in singular forms.

75. A system, as in claim 74, further comprising means for automatically selecting the plural form of the selected keyword when the quantity associated with the data is greater than one.

76. A system, as in claim 75, further comprising:

means for recognizing data which indicates a non-specific plural quantity value; and means for automatically selecting the plural form of the keyword when a non-specific plural quantity is indicated.

77. A system, as in claim 69, further comprising:

means for displaying a list of available restricted keywords for selection by a user; and means for limiting the displayed list of available restricted keywords based on previously entered data.

78. A system, as in claim 71, further comprising means for displaying a list of item sensitive help values for keyword modifiers wherein the displayed list of items depends on the selected keyword.

79. A system, as in claim 71, further comprising:

means for displaying a phrase containing the keywords input by the user; and means for redisplaying the phrase each time a keyword modifier related to a keyword is changed by the user, said changes further comprising modifications, initial data entry, and deletions.

80. A system, as in claim 70, further comprising:

means for displaying the results of the search for selected restricted keywords when at least one is found in the database; and means for displaying the keywords and the keyword modifiers in a natural language form.

81. A system, as in claim 80, further comprising:

keywords from more than one dialect; and means for entering a dialectal preference.

82. A programmable data processing apparatus; comprising:

means for accessing a database comprising information including data records, wherein each set of data records contains at least one keyword;

input means for receiving information including data record entries, the data record entries comprising at least one user-entered keyword;

means for accessing a restricted keyword list, comprising a set of restricted keywords;

means for accessing a synonym keyword list, having a set of synonym keywords, each synonym keyword related to a corresponding restricted keyword; and at least one keyword translator for translating a received user-entered keyword into a restricted keyword.

83. An apparatus, as in claim 82, further comprising means for searching the database for the restricted keyword.

84. An apparatus, as in claim 82, further comprising means for entering in the database the selected restricted keyword.

85. An apparatus, as in claim 82, further comprising means for updating the database with the restricted keyword provided by the keyword translator.

86. An apparatus, as in claim 83, further comprising means for displaying database search results.

87. An apparatus, as in claim 86, wherein the keyword list includes keywords from more than one dialect.

88. An apparatus, as in claim 87, further comprising:

means for receiving a dialectal preference from a user; and means for displaying the dialectal preferred synonym associated with a keyword instead of the keyword provided by the database.

89. An apparatus, as in claim 86, wherein the means for displaying and the means for redisplaying, respectively, display and redisplay in a natural language form.

90. An apparatus, as in claim 84, farther comprising:

means for displaying a phrase containing the keywords input by the user; and means for redisplaying the phrase each time a keyword modifier related to a keyword is changed by the user.

91. An apparatus, as in claim 90, wherein the keyword list includes at least one keyword in plural and at least one keyword in singular forms.

92. An apparatus, as in claim 91, further comprising:

means for recognizing received data which indicates a non-specific plural quantity value;

means for setting a many-flag when the non-specific plural quantity value is detected; and means for selecting the plural form of the keyword from the keyword list when the many-flag is set.

93. An apparatus, as in claim 84, further comprising:

means for displaying to a user a list of available keywords for selection by a user; and means for limiting the displayed list of available keywords based on previously entered data.

94. An apparatus, as in claim 93, further comprising means for displaying a list of item sensitive help values for keyword modifiers, wherein the displayed list of items depends on the selected keyword.

* * * * *